United States Patent

[11] 3,621,337

[72] Inventor George A. Kappenhagen
Northfield, Ohio

[21] Appl. No. 850,186
[22] Filed Aug. 14, 1969
[45] Patented Nov. 16, 1971

[73] Assignee Westinghouse Electric Corporation
Pittsburgh, Pa.

[54] SOLID-STATE PHOTOCONTROL HOUSING ASSEMBLY WITH EXTERNAL HEAT DISSIPATING RIBS
3 Claims, 9 Drawing Figs.

[52] U.S. Cl. .......... 317/100, 250/239, 317/120
[51] Int. Cl. .......... H01j 39/12, H02b 1/10
[50] Field of Search .......... 250/239; 174/16, 52, DIG. 5; 317/99, 100, 101 R, 120

[56] References Cited

UNITED STATES PATENTS

| | | | |
|---|---|---|---|
| 2,762,930 | 9/1956 | Onksen | 250/239 X |
| 3,187,082 | 6/1965 | Allison | 174/16 X |
| 3,398,291 | 8/1968 | Zerfoss | 250/239 |
| 3,408,501 | 10/1968 | Thompson | 250/239 |
| 3,411,049 | 11/1968 | Trincossi | 317/100 X |
| 3,419,726 | 12/1968 | Olsen | 250/239 X |

*Primary Examiner*—Lewis H. Myers
*Assistant Examiner*—Gerald P. Tolin
*Attorneys*—A. T. Stratton, W. D. Palmer and Blair Studebaker

ABSTRACT: A housing configuration for a solid-state photocontrol which includes external heat dissipating ribs, internal heat sink and locating members for the circuit elements, a light-transmissive window and a bottom, electrical connector carrying closure.

SOLID-STATE PHOTOCONTROL HOUSING ASSEMBLY WITH EXTERNAL HEAT DISSIPATING RIBS

BACKGROUND OF THE INVENTION

This invention relates to photocontrols and more particularly to a housing and assembly for a solid-state photoelectric control circuit for use in the operation of, for example, streetlights. Although the solid-state photocontrol represents a substantial improvement in the reliability of photoelectric control devices through the elimination of mechanical relays which have had, over an extended period of use, a tendency to fail due to the welding shut of their contacts, the solid-state photocontrol has presented problems in heat dissipation due to the heat generated by, for example, the control transformer and the power semiconductor.

Copending application, Ser. No. 807,711, filed Mar. 17, 1969 by Joseph C. Engel for "Photoelectric Control Apparatus for Discharge Lamps," which application is owned by the assignee of this invention, clearly describes the many advantages of the solid-state photocontrol as well as describing in detail a suitable solid-state photoelectric control for operating devices, particularly streetlighting luminaires, in response to various levels of ambient light.

SUMMARY OF THE INVENTION

It is broadly an object of this invention to provide a housing and component arrangement for a solid-state photocontrol.

It is another object of this invention to provide a housing and component arrangement for solid-state photocontrols which will suitably dissipate heat generated by the circuit elements.

A still further object of this invention is to provide a housing and component arrangement for a solid-state photocontrol which is compact, provides more suitable heat dissipation, and evidences a pleasing external appearance.

The foregoing objects are accomplished in accordance with the present invention by providing in a solid-state photocontrol, an inverted cup-shaped housing having an opening in the wall thereof and a plurality of external ribs adapted to dissipate heat generated within the housing, first locating and mounting means within the housing for locating and mounting a control transformer, second locating and mounting means within the housing for locating and mounting a printed circuit board, a light-transmitting window member mounted within the opening in the wall of the housing; and a bottom closure member closing off the bottom of the inverted cup-shaped housing and carrying lightning arrester means secured to the interior surface thereof.

BRIEF DESCRIPTION OF THE DRAWINGS

The foregoing objects, and others, along with many of the attendant advantages of the present invention will become more readily apparent and better understood as the following detailed description is considered in connection with the accompanying drawing, in which.

DESCRIPTION OF THE PREFERRED EMBODIMENT

Figure 1:
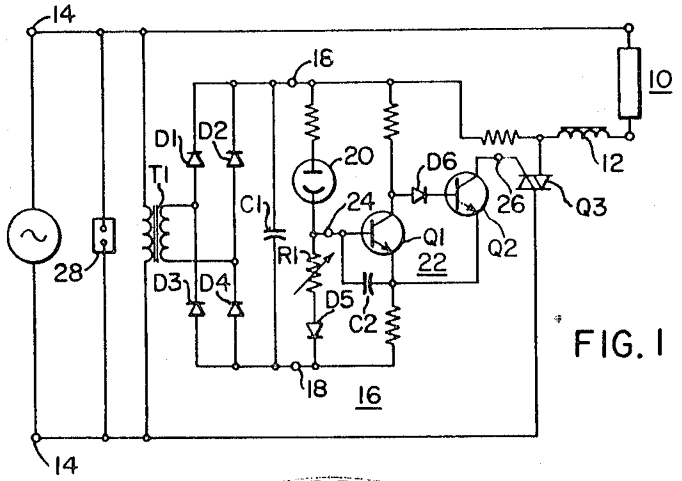
FIG. 1 is a schematic circuit diagram of a typical solid-state photocontrol circuit.

The solid-state photocontrol circuit illustrated in FIG. 1 comprises the subject matter of the above-identified copending application of Joseph C. Engel, Ser. No. 807,711 and is illustrated and will be described for purposes of identifying the various elements of the circuit which are of primary importance to the present invention.

The device or lamp 10, for example a conventional high-pressure mercury vapor discharge lamp, is connected in series with a ballasting impedance 12 and an AC switch Q3 across the input terminals 14 from a 220–240-volt 60-Hz. line.

The AC switch Q3, which is preferably a silicon gate-controlled, bilateral switch, is operable to connect and disconnect the lamp 10 and the input terminals 14 in response to the photoelectric control apparatus generally designated 16. This apparatus or circuit 16 comprises, in part, a rectifier means formed by the transformer T1, diodes D1, D2, D3 and D4 together with capacitor C1 which generates a predetermined DC potential across the output terminals 18 of the rectifier. The photoelectric element 20 which may be for example a conventional cadmium sulfide photocell is connected in series with an impedance R1 across the rectifier output terminals 18. A solid-state control circuit generally designated 22 has an input terminal 24 and an output terminal 26 and is a conventional level detector (Schmidt trigger) formed by diodes Q1 and Q2 which control the gate current of the AC switch Q3. The circuit also has connected thereacross a conventional lightning arrester 28.

Figure 2:
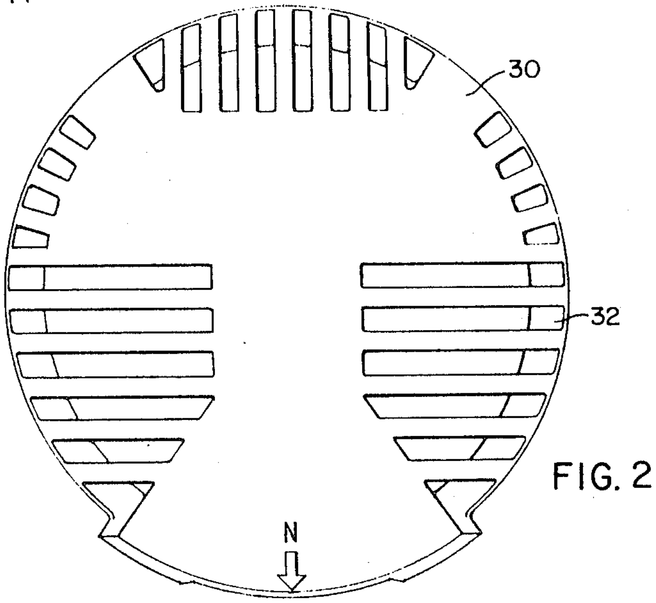
FIG. 2 is a top plan view of the photocontrol housing of the present invention.
Figure 3:
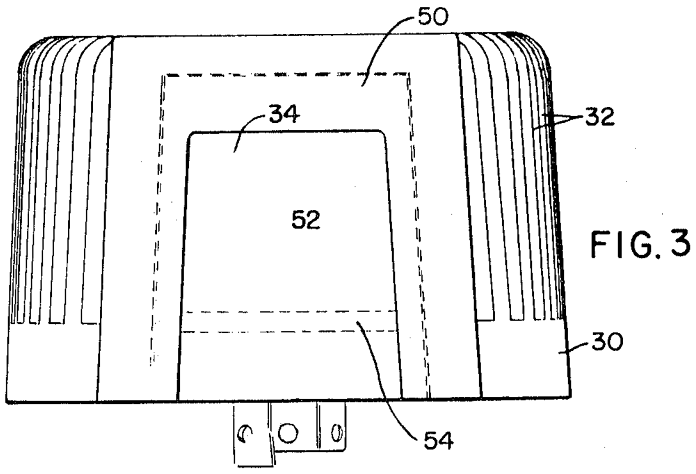
FIG. 3 is a side elevational view of the housing exterior.
Figure 5:
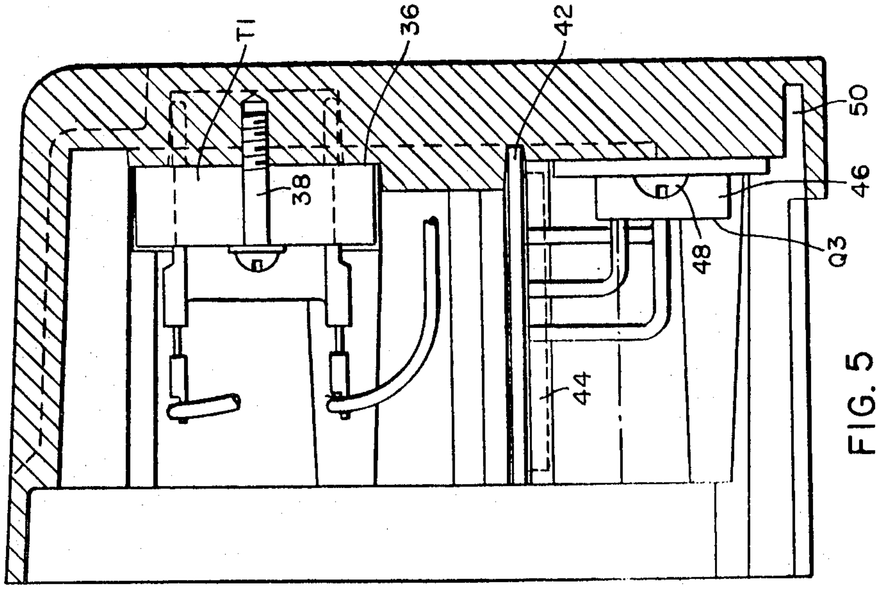
FIG. 5 is a sectional view taken along the line V—V of FIG. 4.
Figure 4:
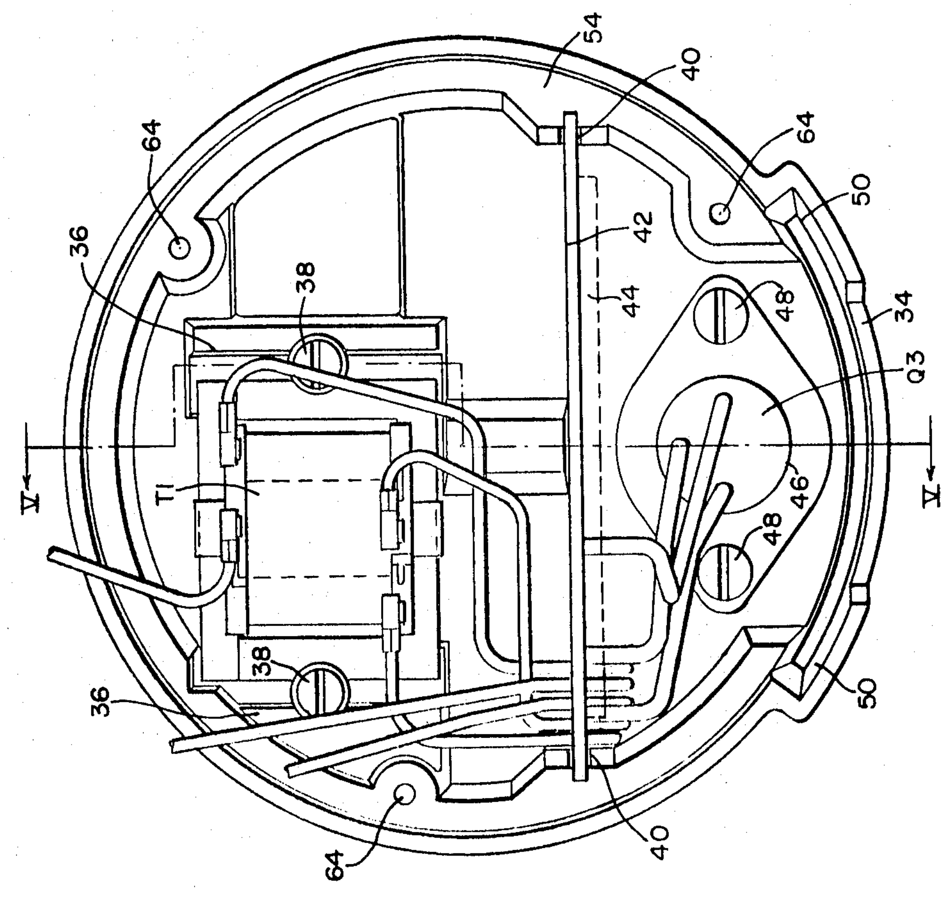
FIG. 4 is a bottom plan view of the solid-state photocontrol of the present invention with the bottom closure plate removed.
Figure 6:
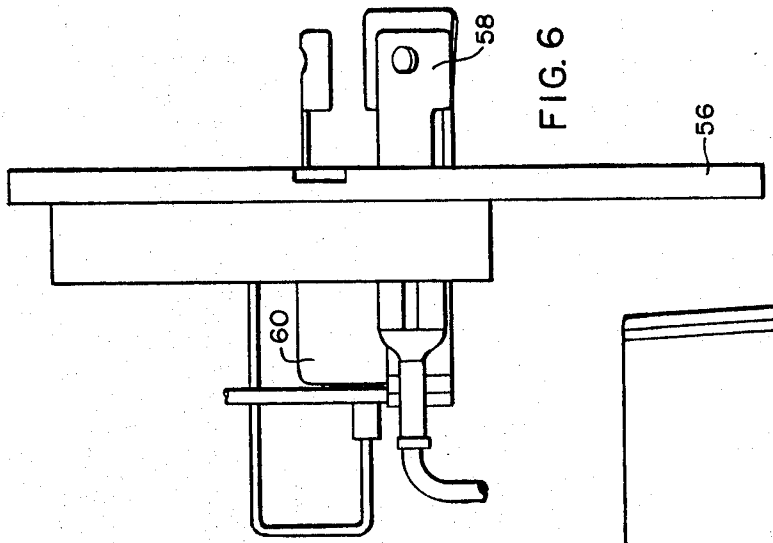
FIG. 6 is a side elevation view of the bottom closure member and associated lightning arrester mechanism and twist lock receptacle connector of the solid-state photocontrol housing.

The just-described circuit of copending application Ser. No. 907,711 is housed and arranged within the novel housing illustrated in FIGS. 2 and 3 which is essentially in the form of an inverted cup-shaped outer housing 30 which is covered by a plurality of raised ridges or ribs 32 which serve to increase the exterior surface cooling area of the housing by approximately 75 percent. Also, along the periphery of the housing 30 is an opening 34 which is adapted to receive a transparent window member which permits light to enter the housing to effect operation of the photocontrol by impinging on a conventional calcium sulfide photocell 20 on the printed circuit board.

Molded within the housing 30 at the top thereof are a pair of comparatively massive heat sink members 36 to which the power transformer T1 is mounted by means of a pair of threaded screws and washers 38. Also molded within the sidewalls of the housing are a pair of oppositely disposed slots 40 which serve to position and mount a printed circuit board 42. The printed circuit board 42 contains all of the elements of the FIG. 1 circuit with the exception of the lightning arrester 28, the transformer T1, the AC switch Q3 and of course the inductor 12 and lamp or device 10. The remainder of the elements are illustrated by a phantom block 44 on the side of the printed circuit board facing the opening in the housing 34 and the photocell 20 is situated approximately centrally of the printed circuit board facing the opening 34.

The power semiconductor or AC switch Q3 is press-fitted into a heat sink container 46 also on the top of the housing and secured thereto by a pair of threaded bolts 48.

Figure 8:
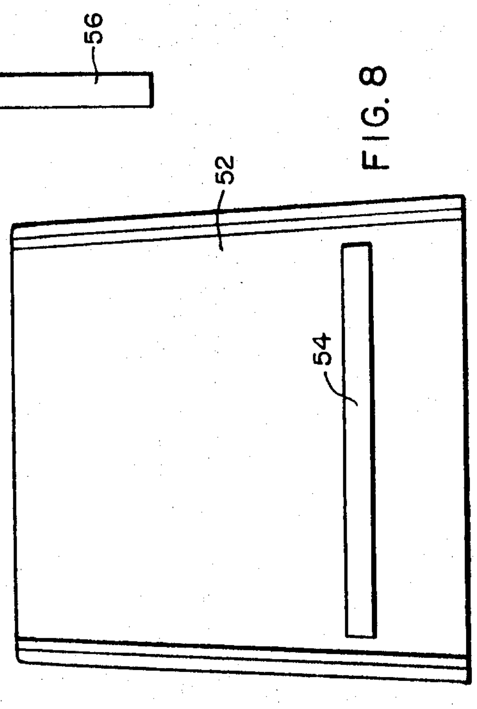
FIG. 8 is an interior view of the transparent window member of this invention.
Figure 7:
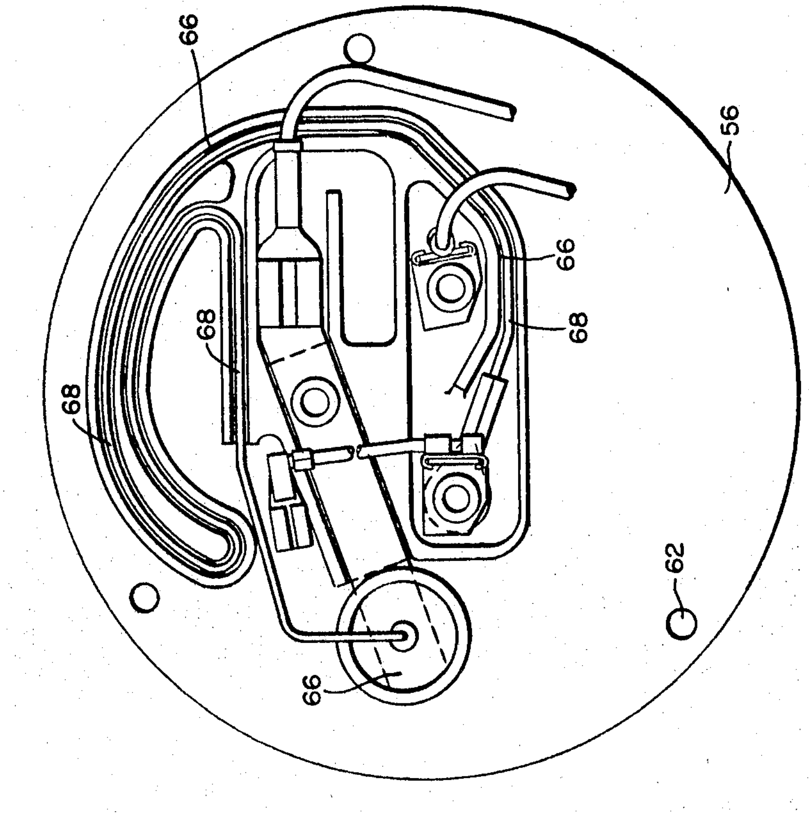
FIG. 7 is a plan view of the underside of the bottom closure member of the present invention.
Figure 9:
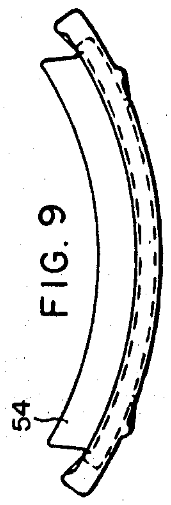
FIG. 9 is a bottom view of the transparent window illustrated in FIG. 8.

Around the opening 34 cast in the housing 30 is a window-receiving slot or groove 50 which receives the tapered window piece 52 (FIG. 8) which may be glass but which is preferably of clear plastic. The window piece 52 has a flange 54 on the interior surface thereof which serves as an extension of the flange 54 formed on the interior surface of the housing 30. The bottom closure plate 56 closes off the bottom of the housing 30 and carries the electrical connector lugs 58 which connect the lightning arrester 60 and the photocontrol circuit to the remainder of the ballast and lightning circuit. The bottom plate or bottom closure 56 is secured to the housing 30 through a plurality of bolts (not shown) which extend through the apertures 62 in the base plate and are threaded into threaded bores 64 in the casting 30. The bottom plate in addition to carrying the electrical connector lugs 58 and the lightning arrester 60 serves to maintain the printed circuit board 42 in place in the slots 40 as well as retaining the plastic window 52 in place in the slot 50 by virtue of the interaction between the bottom plate 56 and the flange 54 on the transparent window. The baseplate 56 has the further feature of including molded-in channels 66 to carry the uninsulated lightning arrester series resistance leads 68.

As will be apparent from the foregoing the solid-state photocontrol of the present invention provides a compact and integrated design in which the surface of the housing provides a plurality of ribs to enable the housing to rapidly dissipate heat generated by the power semiconductor and the transformer. In addition to the plurality of exterior ribs, substantial internal heat sinks provide the mountings for the power semiconductor and transformer. The printed circuit board 42 which carries all of the elements of the solid-state photocontrol circuit with the exception of the power transformer and the power semiconductor is securely mounted within the housing through slots 40 and base member 56 and presents the light-sensitive element or photocell to the window 52 which is also secured within the housing through the coaction of locating slot 50 and flange 54 on the window piece 52 and the baseplate 56.

This novel assemblage provides for a compact functional plug-in solid-state photocontrol combination with a pleasing external appearance.

I claim as my invention:

1. A solid-state photocontrol housing assembly comprising;
   an inverted cup-shaped housing including an annular sidewall having an opening therein, and a plurality of external heat-dissipating ribs thereon,
   a first locating and mounting means within said housing for locating and mounting a control transformer,
   a second locating and mounting means within said housing for locating and mounting a printed circuit board,
   a flanged slot surrounding said opening in said housing wall,
   a light-transmissive window member having a flange thereon perpendicular to said window, said light-transmissive window being slidably received in said flanged slot surrounding said opening in said wall, and
   a bottom closure member closing off the bottom of said inverted cup-shaped housing, said bottom closure member coacting with the flange on said window to thereby maintain said light-transmissive window seated within said flanged slot.

2. A solid-state photocontrol housing assembly comprising:
   an inverted cup-shaped housing including an annular sidewall having an opening therein, and a plurality of external heat-dissipating ribs thereon,
   a first locating and mounting means within said housing for locating and mounting a control transformer,
   a second locating and mounting means comprising a pair of spaced vertical slots in the sidewall of said housing for locating and mounting a printed circuit board,
   a light-transmissive window member mounted within said opening in said wall of said housing, and
   a bottom closure member closing off the bottom of said inverted cup-shaped housing.

3. A solid-state photocontrol housing assembly according to claim 2 wherein said bottom closure member is secured to said housing and carries on the inner surface thereof lightning arrester means and on the outer surface electrical connector blades.

* * * * *